(12) United States Patent
Campagna

(10) Patent No.: US 8,971,528 B2
(45) Date of Patent: Mar. 3, 2015

(54) MODIFIED ELLIPTIC CURVE SIGNATURE ALGORITHM FOR MESSAGE RECOVERY

(71) Applicant: Certicom Corp., Mississauga (CN)

(72) Inventor: Matthew John Campagna, Ridgefield, CT (US)

(73) Assignee: Certicom Corp., Mississauga (CA)

( * ) Notice: Subject to any disclaimer, the term of this patent is extended or adjusted under 35 U.S.C. 154(b) by 234 days.

(21) Appl. No.: 13/753,126

(22) Filed: Jan. 29, 2013

(65) Prior Publication Data

US 2014/0211938 A1 Jul. 31, 2014

(51) Int. Cl.
*H04L 9/00* (2006.01)
*H04L 9/32* (2006.01)

(52) U.S. Cl.
CPC .................... *H04L 9/3252* (2013.01)
USPC ............... 380/44; 380/28; 380/30; 713/176

(58) Field of Classification Search
None
See application file for complete search history.

(56) References Cited

U.S. PATENT DOCUMENTS

| | | | |
|---|---|---|---|
| 2009/0100267 A1* | 4/2009 | Brown et al. | 713/176 |
| 2010/0040225 A1* | 2/2010 | Venelli et al. | 380/28 |
| 2012/0087493 A1* | 4/2012 | Chidambaram et al. | 380/44 |
| 2012/0239930 A1* | 9/2012 | Zaverucha et al. | 713/168 |

FOREIGN PATENT DOCUMENTS

WO 2009/030021 3/2009

OTHER PUBLICATIONS

Shen et al., "SM2 Digital Signature Algorithm", Oct. 24, 2011, IETF, pp. 1-16.*
International Search Report mailed on Oct. 11, 2013 in International application No. PCT/US2013/023627, filed on Jan. 29, 2013.
Shen, S., et al., Chinese Academy of Science, Oct. 24, 2011, SM2 Digital Signature Algorithm; draft-shen-sm2-ecdsa-00, pp. 1-16.
Leon A. Pintsov and Scott A. Vanstone: "Postal Revenue Collection in the Digital Age," Y. Frankel (ed.): FC 2000, LNCS 1962, pp. 105-120, Jan. 1, 2000.

* cited by examiner

*Primary Examiner* — Jason K. Gee
*Assistant Examiner* — Henry Tsang
(74) *Attorney, Agent, or Firm* — Oblon, McClelland, Maier & Neustadt, L.L.P.

(57) ABSTRACT

A modified Chinese State Encryption Management Bureau's SM2 Elliptic Curve Signature Algorithm that offers partial message recovery and lowers the signature size for a given cryptographic strength. The modified SM2 Elliptic Curve Signature Algorithm includes a signature and verification algorithm that modifies a signature generation primitive to compute a key derived from the ephemeral signing key, and a multiple of the signer's public key.

12 Claims, 5 Drawing Sheets

US 8,971,528 B2

MODIFIED ELLIPTIC CURVE SIGNATURE ALGORITHM FOR MESSAGE RECOVERY

FIELD

The present disclosure is directed to a method by which the Chinese State Encryption Management Bureau's SM2 Elliptic Curve Signature Algorithm is modified to a signature scheme that offers partial message recovery, and lowers the signature size for a given cryptographic strength.

BACKGROUND

Signature schemes are designed to be the digital equivalent of handwritten signatures. They are used to provide authentication, data-integrity, and non-repudiation. A signature scheme has a signer A, who intends to send a message M, to one or more recipients in an authentic manner. Signature schemes primarily include four basic algorithms: parameter generation or setup, key generation, signature generation, and signature verification.

A digital signature provides integrity and authenticity for messages, and is the only security service specified by the Near Field Communication (NFC) forum. The goal is to avoid tampering with a message (integrity) and to have some sort of proof that the message was authenticated or "digitally signed" by a trusted part (authenticity).

Given that digital signatures can provide integrity, authenticity, and confidentiality, they are extremely versatile and can accommodate almost any application scenario. There are two well known digital signature schemes that have withstood the test of time. The RSA scheme, which is based on the problem of factoring larger integers, and elliptic curve cryptography (EEC), which is based on the intractability of computing discrete logarithms for elliptic curve groups.

The Chinese State Encryption Management Bureau (SEMB) published a series of elliptic curve cryptographic algorithms called the SM2 Elliptic Curve Signature Algorithm (SM2-ECSA). The SM2-ECSA digital signature scheme is similar to the Nyberg-Rueppel digital signature scheme described in IEEE 1363-2000, sections 7.2.5 and 7.2.6. A variant of the Nyberg-Rueppel digital signature scheme known as the Elliptic Curve Pinstov-Vanstone Signature scheme is also standardized in ANSI X9.92. The SM2-ECSA digital signature scheme differs from the Nyberg-Rueppel scheme by a modification of the signature generation formula. It deviates from traditional signature schemes in the inclusion of other information of the user. This other information of the user is incorporated into the message being signed. The SM2-ECSA specification fails to name this other information of the user, and so for the sake of simplicity it is referred to herein as the identity hash value.

The SM2-ECSA digital signature scheme setup is consistent with other digital signature schemes. However, the SM2 adds to the traditional digital signature schemes in regards to distinguished identifiers and the creation of the identity hash value. The SM2-ECSA digital signature algorithm uses additional information, the so-called distinguishing identifiers, as well as elliptic curve parameters and the public key of the signer. The agreement on how these are to be formed is part of a scheme setup and requires as input the curve parameters, an identifier of the signer, a base point G of the elliptic curve, and a public key of the signer $P_A$. The algorithm also assumes a consistently agreed upon hash function as specified in the scheme setup.

BRIEF DESCRIPTION OF THE DRAWINGS

A more complete appreciation of the embodiments described therein, and many of the attendant advantages thereof will be readily obtained as the same becomes better understood by reference to the following detailed description when considered in connection with the accompanying drawings, wherein.

DETAILED DESCRIPTION

Figure 1:
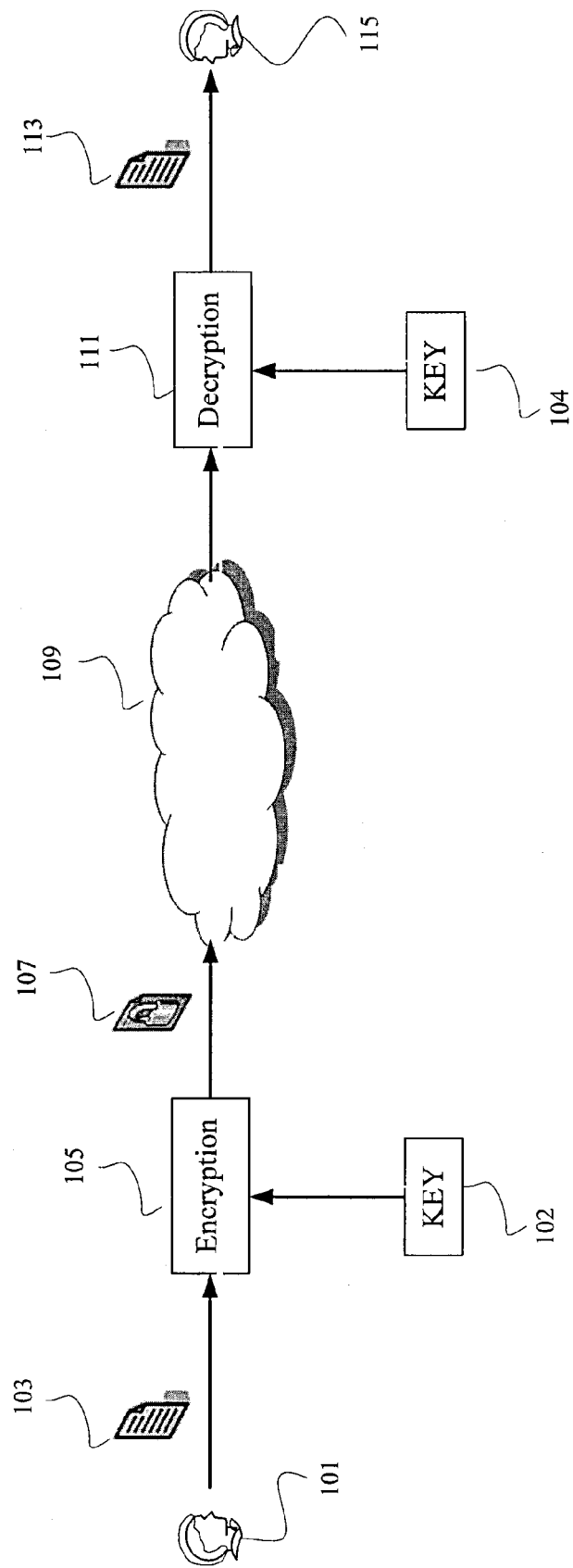
FIG. 1 depicts a system diagram of the encryption and decryption process of the modified SM2-ECSA process.

In the present embodiments, a modification to the SM2 Elliptic Curve Signature Algorithm is presented to create a variant that provides partial message recovery. Further, the modified algorithm also lowers the signature size for a given cryptographic strength, which it achieves by modifying the signature generation primitive to compute a key derived from an ephemeral signing key and a multiple of the signer's public key. This is based upon the verification routine being capable of recovering the public signing ephemeral key summed with a multiple of the signer's public key.

According to a first embodiment, there is provided a digital signature generation method for a transmitting-entity, comprising: (1) partitioning a message to be transmitted into a first portion and a second portion; (2) generating an ephemeral key; (3) calculating an encryption key based on the generated ephemeral key and a public key; (4) computing a ciphertext by encrypting the first portion of the message using the calculated encryption key; (5) computing a hash value by applying a first hash function to a concatenation of an identity hash value, the computed ciphertext, and the second portion of the message; (6) calculating a signature key using a private key, the calculated encryption key, and the computed hash value; and (7) outputting an enciphered message that includes the calculated signature key, the computed ciphertext, and the second portion of the message.

According to a second embodiment, there is provided a digital signature verification method for a receiving-entity, comprising: (1) receiving an enciphered message that includes a signature key, a ciphertext, and a second portion of a message; (2) computing a hash value by applying a first hash function to a concatenation of an identity hash value, the received ciphertext, and the received second portion of the message; (3) computing an ephemeral key based on a public key, the received signature key, and the computed hash value; (4) computing a decryption key based on the computed ephemeral key; (5) calculating a first portion of the message by decrypting the received ciphertext using the computed decryption key; and (6) checking that the calculated first portion of the message has necessary redundancy to verify the message.

According to a third embodiment, there is provided a digital signature generation apparatus, comprising a processor configured to: partition a message to be transmitted into a first portion and a second portion; generate an ephemeral key; calculate an encryption key based on the generated ephemeral key and a public key; compute a ciphertext by encrypting the first portion of the message using the calculated encryption key; compute a hash value by applying a first hash function to a concatenation of an identity hash value, the computed ciphertext, and the second portion of the message; calculate a signature key using a private key, the calculated encryption key, and the computed hash value; and output an enciphered message that includes the calculated signature key, the computed ciphertext, and the second portion of the messager.

According to a fourth embodiment, there is provided a digital signature verification apparatus, comprising a processor configured to: receive an enciphered message that includes a signature key, a ciphertext, and a second portion of a message; compute a hash value by applying a first hash function to a concatenation of an identity hash value, the received ciphertext, and the received second portion of the message; compute an ephemeral key based on a public key, the received signature key, and the computed hash value; compute a decryption key based on the computed ephemeral key; calculate a first portion of the message by decrypting the received ciphertext using the computed decryption key; and check that the calculated first portion of the message has necessary redundancy to verify the message.

The present disclosure describes the modified SM2 Elliptic Curve Signature Algorithm, which provides partial message recovery and lowers the signature size for a given cryptographic strength. In general, for a given encryption scheme with a security strength denoted by S, the signature size of the encryption scheme is 4*S. The modified SM2 Elliptic Curve Signature Algorithm can reduce this signature size to as much as 2*S. Specifically, the modified SM2 Elliptic Curve Signature Algorithm achieves a 50% reduction in the signature size as compared to traditional encryption algorithms. Signature schemes such as the SM2-ECSA are designed to be the digital equivalent of handwritten signatures. They are used to provide authentication of data, and the signature scheme incorporates a signer A who intends or is challenged to send a particular message M, to one or more recipients in an authentic fashion.

A digital signature is a value produced by the message sender to bind the message data to the sender's identity and provide a means of verifying the integrity of the message to detect tampering. The modified SM2-ECSA algorithm uses the private key of the sender to create an encrypted version of the plain text. Sender A's public key along with the identity hash value is used to verify the signature by the recipient. Digital signatures are used to ensure the message recipient that the message originated from the identified sender and that the message contents have not been altered since they have been signed by the sender. The public key can be distributed openly to encrypt messages and to verify digital signatures, but the private key should be carefully guarded by its owner. This is necessary because the private key is used to prove the identity of the certificate subject and to decrypt messages that are intended for that subject.

In what follows, the system diagram of the encryption and decryption process of the modified ECSA algorithm and its scheme setup is described. Next, the signature primitive algorithm used by the transmitting-entity for generating digital signatures is explained. Finally, the verification primitive algorithm used by the receiving-entity for verifying the signed message is described.

FIG. 1 depicts a system diagram of the encryption (on the transmitting-entity side) and decryption process (on the receiving-entity side) that employs the modified ECSA algorithm. User A (101) uses its private key denoted by $d_A$ (102) to encrypt the message of the plain text (103) in the signature primitive encryption algorithm (105) to create an enciphered text (107). The enciphered text (107), on transmission through a communication medium (109) is then received by the receiving-entity, user B (115). Note that the communication medium (109) can be a wireless or wired medium, ranging from a single point-to-point link, or a local/wide area communication network. The decryption of enciphered text (107) takes place in the decryption unit (111), wherein the modified SM2-ECSA verification primitive verifies the original signed message. The key used for decryption in (104) is A's public key (denoted by $P_A$) and the identity hash value ($Z_A$, to be described later) of the alleged signer A. In doing so, the original plain text (103) is replicated (113) to be delivered in an authentic manner to the recipient, user B.

A basic description of the modified SM2-ECSA algorithm, including the scheme setup, key generation, identity hash value generation, the signature primitive algorithm, and the signature verification algorithm is now presented.

The modified SM2-ECSA algorithm contains a preamble that indicates other elements of a traditional setup that must be agreed upon. The cryptographic components for an elliptic field $F_p$, wherein p is a prime number can be defined as follows:

(1) The elliptic curve parameters comprise of a tuple (p, a, b, G, n, h) wherein p is an integer specifying the finite field $F_p$; a, b are the field elements; G is the base point; n is the order of G, and h is the cofactor of n. Note that when $p=2^m$, an irreducible polynomial determines and reduces the elements of the field $F_{2^m}$ where the two elements a, b∈$F_p$ define an equation of an elliptic curve $E[F_p]$, with a base point $G=(x_G, y_G)$ of order n. Note that an elliptic curve domain parameter tuple for a field defined for the binary case can be described in a similar manner.

(2) The hash functions are $H_{256}$ and $H_v$.

(3) An agreement on how the identity hash value is to be derived.

Note that the SM2-ECSA scheme setup is consistent with digital signature schemes, but adds to those setup schemes with respect to the distinguished identifiers and the creation of the identity hash value. The key generation phase generates entity A's key pair, which includes a private key of user A ($d_A$) and the public key of user A ($P_A$). Note that $P_A=d_A G=(x_A, y_A)$.

Figure 2:
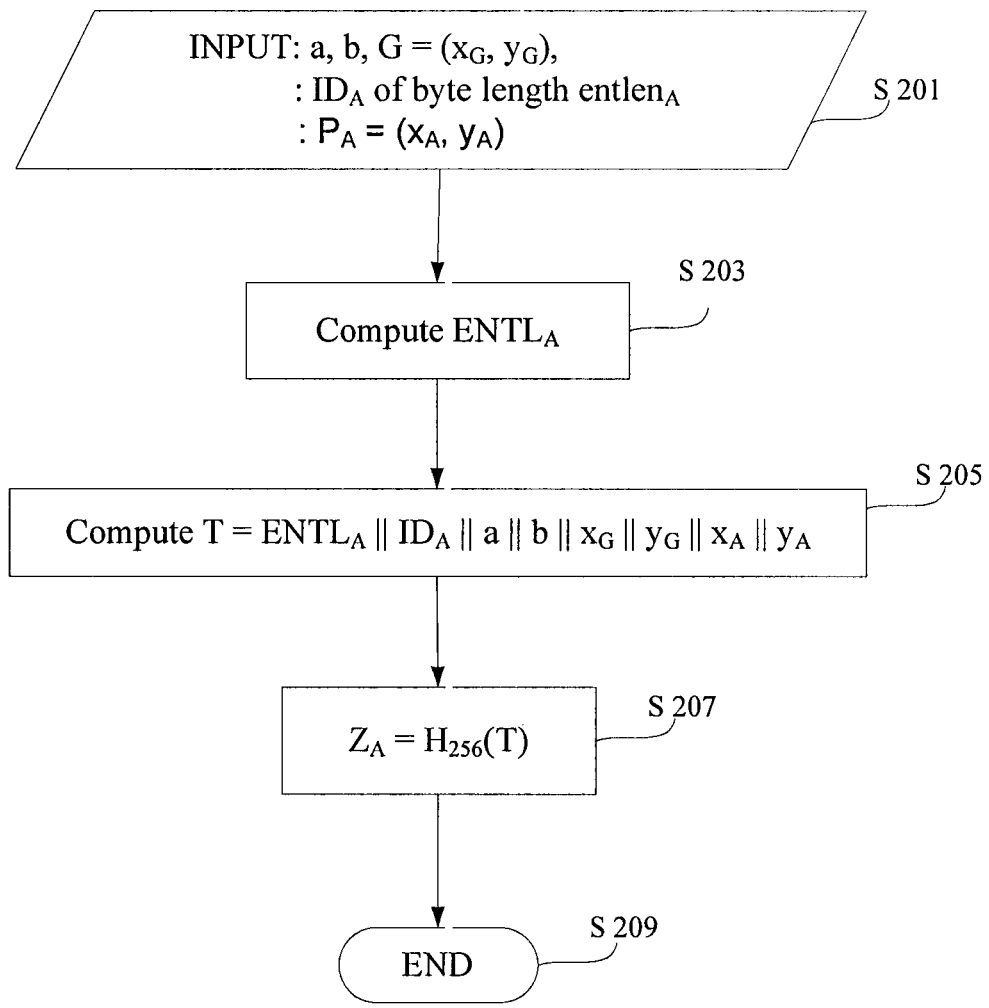
FIG. 2 depicts the steps taken to derive the identity hash value.

FIG. 2 illustrates the steps taken in the modified SM2-ECSA algorithm to derive the identity hash value ($Z_A$) of the signer (user A).

In step S201, $Z_A$ is computed using the elliptic curve parameters (a, b, G), the public key ($P_A$) of the signer, and a distinguishing identifier, $ID_A$, of byte-length represented by $entlen_A$.

In step S203, a two-byte string formed from the integer $entlen_A$ and represented as $ENTL_A$ is computed.

In step S205, a byte string T is computed as follows:

$$T=ENTL_A\|ID_A\|a\|b\|x_G\|y_G\|x_A\|y_A \qquad (1)$$

wherein the ∥ sign indicates concatenation.

In step S207, the identity hash value ($Z_A$) is computed as the hash function $H_{256}(T)$.

Figure 3:
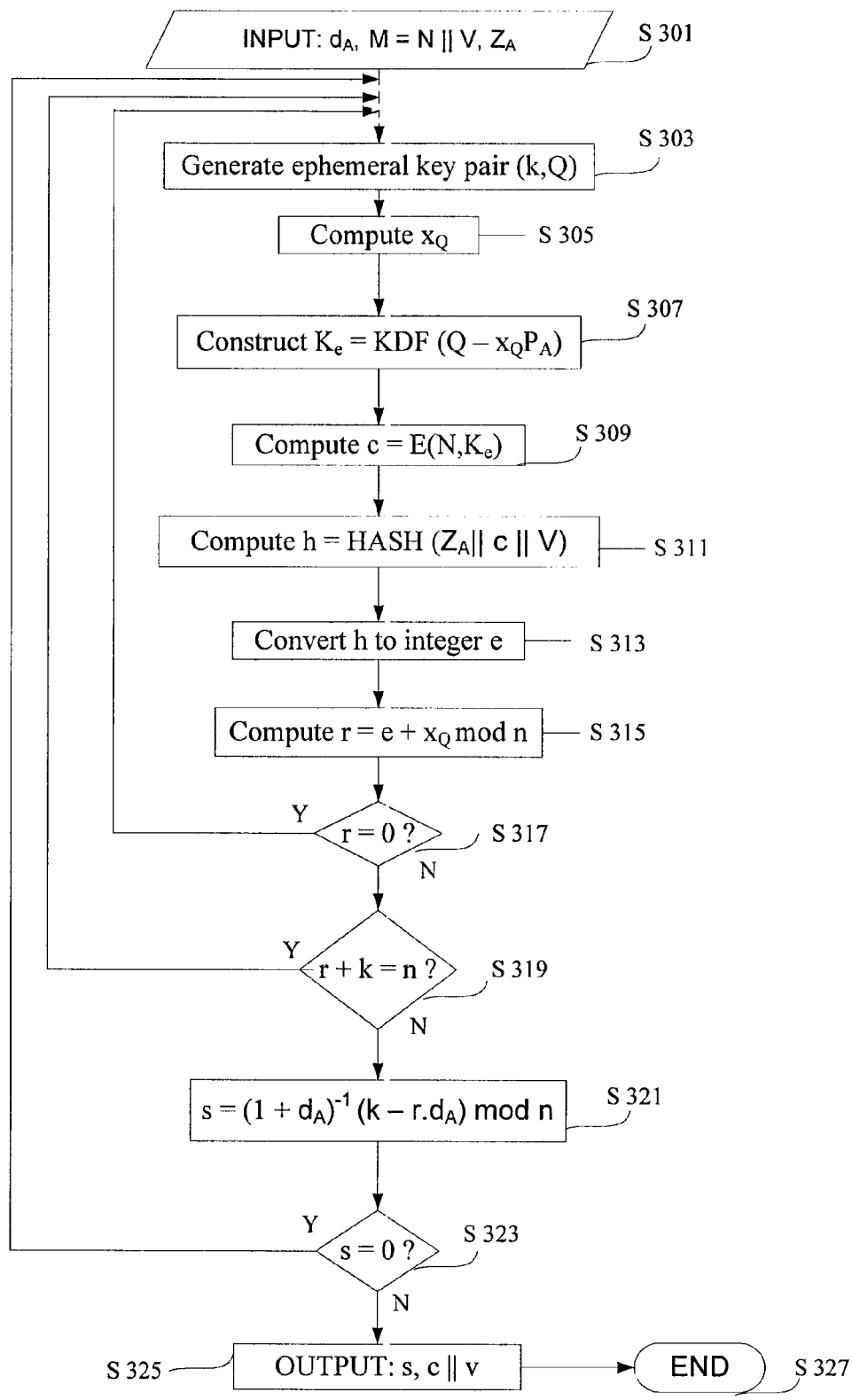
FIG. 3 depicts the modified SM2-ECSA signature primitive algorithm used to create a digital signature at the transmitting-entity.

FIG. 3 illustrates the modified SM2-ECSA signature primitive algorithm used by the transmitting-entity.

In step S301, the input to the algorithm includes A's private key ($d_A$), a message M=N∥V, and the identity hash value ($Z_A$) of the signer. Note that N and V are the hidden and visible parts of the message respectively.

In step S303, an ephemeral key pair (k, Q) is generated.

In step S305, the integer conversion of the x-coordinate of Q, denoted by $x_Q$ is computed.

In step S307, an encryption key ($K_e$) is computed as follows:

$$K_e=KDF(Q-x_Q P_A) \qquad (2)$$

where KDF is a key derivation function that takes as input a point, and possibly other information, and generates the encryption key.

In step S309, the ciphertext c is computed as follows:

$$c = E(N, K_e) \quad (3)$$

wherein E is a suitable encryption scheme that takes as input plaintext and the encryption key and produces the ciphertext.

In step S311, the cofactor h is computed as a hash value of the concatenation of the parameters: identity hash value, ciphertext, and the visible part of the message. Specifically, the cofactor is computed as follows:

$$h = \text{Hash}(Z_A \| c \| V) \quad (4)$$

Note that the Hash function should be such that it could incorporate additional input information.

In step S313, the cofactor h is converted to an integer e.

In step S315, r, the signature component value is computed as follows:

$$r = e + x_Q \bmod n \quad (5)$$

In step S317, the process checks if r is equal to zero. If so, the algorithm loops back to step S303, wherein a new ephemeral key pair is generated. If r≠0 in step S317, the algorithm proceeds to step S319, in which the process checks if the value of r+k is equal to m. If so, the algorithm once again loops back to step S303 to generate a new ephemeral key pair (k, Q). Otherwise, the algorithm proceeds to step S321, in which the signature key, s, is computed as follows:

$$s = (1 + d_A)^{-1}(k - r \cdot d_A) \bmod n \quad (6)$$

In step S323, a final check is made to determine if s is equal to zero. If so, the process returns to step S303 to generate a new ephemeral key pair. Otherwise if s is not equal to zero, the algorithm outputs the value of s and c to be used to sign the message M as s, c∥V.

Next, the SM2-ECSA verification primitive algorithm (used by the receiving-entity) which is implemented in block 111 on the recipient side is described.

Figure 4:
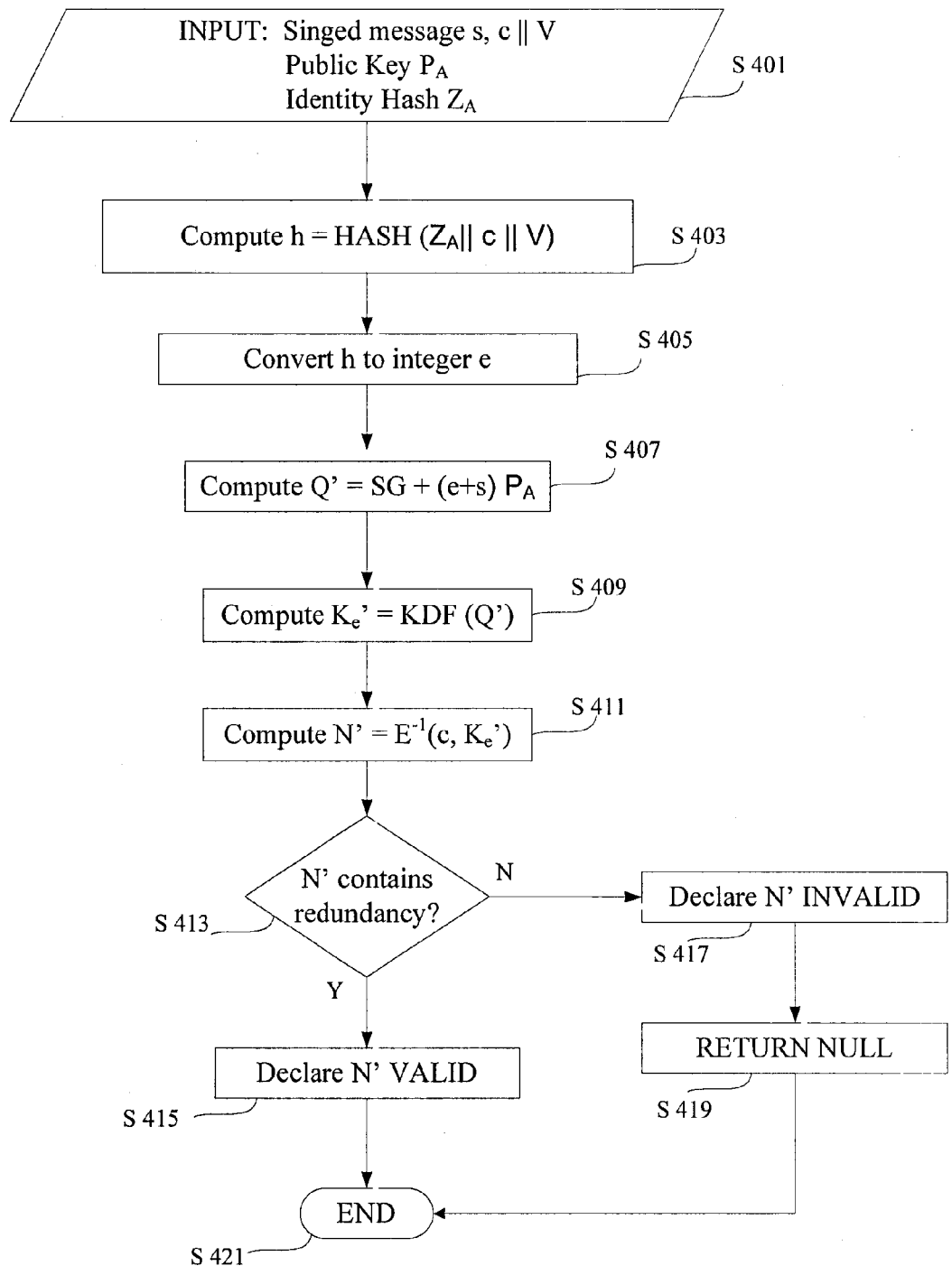
FIG. 4 depicts the modified SM2-ECSA verification primitive to verify and recover a part of the signed message at the receiving-entity.

As shown in FIG. 4, in step S401 the signed message s, c∥V, the public key $P_A$, and the identity hash value $Z_A$ are inputs to the algorithm.

In step S403, the cofactor h, is computed with the same hash function as that used in the signature generation scheme and additional input information as follows:

$$h = \text{HASH}(Z_A \| c \| V) \quad (7)$$

In step S405, h is converted to its integer value represented by parameter e.

In step 407, Q' is computed as follows:

$$Q' = sG + (e+s)P_A \quad (8)$$

In step S409, $K_e' = \text{KDF}(Q')$ is computed. Note that in computing $K_e'$, the same key derivation function used in the signature generation algorithm is used, including the same additional information.

In step S411, the hidden message encoded in the signature, N', is computed as follows:

$$N' = E^{-1}(c, K_e') \quad (9)$$

In step S413, a check is made to determine if N' contains redundancy. If so, in step S415, N' is declared valid and the process ends successfully. If N' does not contain the necessary redundancy in step S417 N' is declared invalid, and in step S419, a NULL is returned and the process ends.

The correctness of the above embodiments is illustrated by showing that the derived value Q' in the verification primitive is equal to the computed value $Q - x_Q P_A$ in the signature primitive:

$$\begin{aligned} Q' &= sG + (e+s)P_A \quad (10)\\ &= sG + (r - x_Q + s)P_A \\ &= (s + s \cdot d_A + r \cdot d_A)G - x_Q P_A \\ &= kG - x_Q P_A \\ &= Q - x_Q P_A \end{aligned}$$

In the above embodiments the proposed SM2 modified elliptic curve signature algorithm provides partial message recovery and lowers the signature size for a given cryptographic strength. The embodiments achieve this by modifying the signature generation parameter to compute a key derived from the ephemeral signing key and a multiple of the signer's public key. The disclosed embodiments are based on the verification described above, specifically by recovering the public signing ephemeral key summed with the multiple of the signer's public key. It should be noted, however, that the strict concatenation into the hash function in the signature and verification primitive can be relaxed to be any input of the three variables c, $Z_A$, and V, as long as it is done the same way in the signing and verifying steps.

The signature and the verification algorithms described above can be implemented in units 105 and 111 of FIG. 1 respectively, by one or more computers and/or one or more specialized circuits. A hardware description of such a computer is described with reference to FIG. 5.

Figure 5:
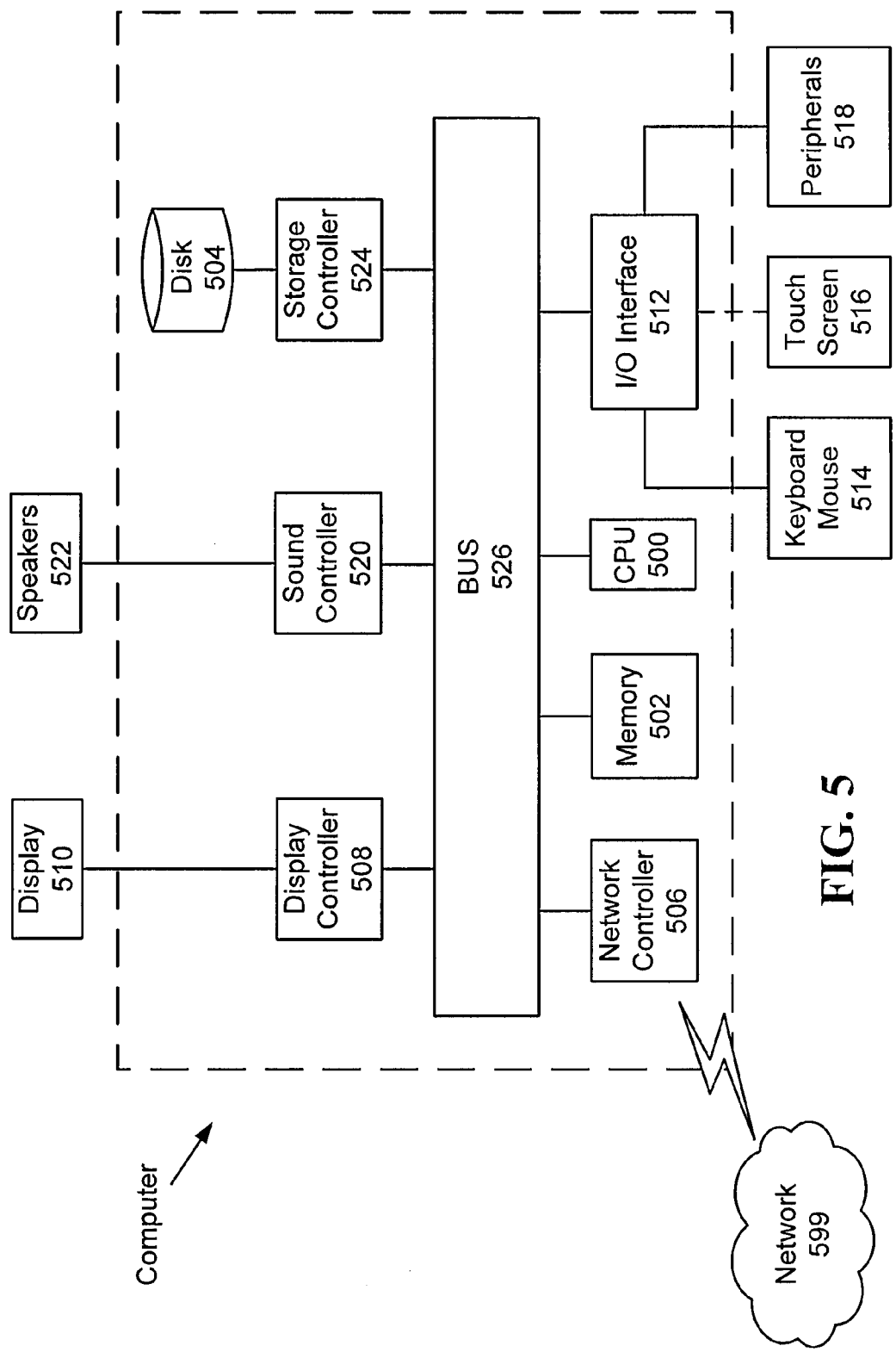
FIG. 5 shows a block diagram of a computer according to exemplary embodiments.

In FIG. 5 the computer includes a CPU 500 which may perform the processes described above.

The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server.

Further, the claimed advancements may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The computer in FIG. 5 also includes a network controller 506, such as an Intel Ethernet PRO network interface card from Intel Corporation of America, for interfacing with network 599. As can be appreciated, the network 599 can be a public network, such as the Internet, or a private network such as an LAN or WAN network, or any combination thereof and can also include PSTN or ISDN sub-networks. The network 599 can also be wired, such as an Ethernet network, or can be wireless such as a cellular network including EDGE, 3G and 4G wireless cellular systems. The wireless network can also be WiFi, Bluetooth, or any other wireless form of communication that is known.

One embodiment of the computer may be used by the transmitting entity 101, to process the modified ECSA encryption signature algorithm of unit 105 in the CPU 500, and another embodiment of the computer may be used by the receiving entity to process the modified ECSA decryption algorithm 111. The network controller 506 may be used to establish a communication channel between the two parties, possibly through the network 109.

The computer further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computer, such as Sound Blaster X-Fi Titanium from Creative, to interface with speakers/microphone 522 thereby providing sounds and/or music. The speakers/microphone 522 can also be used to accept dictated words as commands for controlling the computer or for providing location and/or property information with respect to the target property.

The general purpose storage controller 524 connects the storage medium disk 504 with communication bus 526, which may be an ISA, EISA, VESA, PCI, or similar, for interconnecting all of the components of the computer. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

In the above description, any processes, descriptions or blocks in flowcharts should be understood to represent modules, segments, or portions of code that include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A digital signature generation method for a transmitting-entity, comprising:

partitioning, by a processing circuit, a message to be transmitted into a first portion and a second portion;
generating an ephemeral key;
calculating, by the processing circuit, an encryption key based on the generated ephemeral key and a public key;
computing, by the processing circuit, a ciphertext by encrypting the first portion of the message using the calculated encryption key;
computing, by the processing circuit, a hash value by applying a first hash function to a concatenation of an identity hash value, the computed ciphertext, and the second portion of the message;
calculating, by the processing circuit, a signature key using a private key, the calculated encryption key, and the computed hash value; and
outputting an enciphered message that includes the calculated signature key, the computed ciphertext, and the second portion of the message, wherein the signature key, s, is calculated by the equation:

$$s=(1+d_A)^{-1}(k-r \cdot d_A) \bmod n,$$

wherein $d_A$ is the private key of the transmitting-entity, k is the ephemeral key, n is the order of the base point of the elliptic curve, and r is a first signature component calculated by the equation:

$$r=e+x_Q \bmod n, \text{ and}$$

wherein e is an integer value derived from the hash value h, and $x_Q$ is an integer conversion of the x-coordinate of the ephemeral key.

2. The digital signature generation method of claim 1, wherein the step of calculating the encryption key, $K_e$, is calculated by the equation:

$$K_e=\text{KDF}(Q-x_Q P_A),$$

wherein KDF is a key derivation function, $P_A$ is the public key, Q is the ephemeral key, and $x_Q$ is an integer conversion of the x-coordinate of Q.

3. The digital signature generation method of claim 1, further comprising:
calculating the identity hash value by
forming a two-byte string of a distinguishing identifier;
forming a byte string of the distinguishing identifier, the public key, and a set of elliptic curve parameters; and
computing the identity hash value by applying a second hash function to the byte string.

4. The digital signature generation method of claim 1, wherein the step of calculating the ciphertext, c, comprises calculating c by the equation:

$$c=E(N,K_e),$$

wherein E is an encryption scheme, N is the first portion of the message to be transmitted, and k is the encryption key.

5. The digital signature generation method of claim 1, wherein the step of calculating the hash value, h, comprises calculating h by the equation:

$$h=\text{Hash}(Z_A\|c\|V),$$

wherein $Z_A$ is the identity hash value, c is the ciphertext, V is the second portion of the message to be transmitted, and Hash is the first hash function.

6. A digital signature verification method for a receiving-entity, comprising:
receiving an enciphered message that includes a signature key, a ciphertext, and a second portion of a message;
computing, by a processing circuit, a hash value by applying a first hash function to a concatenation of an identity hash value, the received ciphertext, and the received second portion of the message;

computing, by the processing circuit, an ephemeral key based on a public key, the received signature key, and the computed hash value;

computing, by the processing circuit, a decryption key based on the computed ephemeral key;

calculating, by the processing circuit, a first portion of the message by decrypting the received ciphertext using the computed decryption key; and checking that the calculated first portion of the message has necessary redundancy to verify the message, wherein the ephemeral key, Q', is calculated by the equation:

$$Q'=sG+(e+s)P_A, \text{ and}$$

wherein s is the signature key, $P_A$ is the public key, e is the hash value expressed as an integer, and G is a base point of an elliptic curve.

7. The digital signature verification method of claim 6, wherein the step of computing the decryption key, $K_e'$, comprises calculating the decryption key by the equation:

$$K_e'=KDF(Q'),$$

wherein KDF is a key derivation function, and Q' is the ephemeral key.

8. The digital signature verification method of claim 6, wherein the step of computing the first portion of the message, N', comprises calculating the first portion by the equation:

$$N'=E^{-1}(c,K_e'),$$

wherein c is the received ciphertext, $K_e'$ is the computed decryption key, and $E^{-1}$ is a decryption scheme.

9. A digital signature generation apparatus, comprising:
a processing circuit configured to:
partition a message to be transmitted into a first portion and a second portion;
generate an ephemeral key;
calculate an encryption key based on the generated ephemeral key and a public key;
compute a ciphertext by encrypting the first portion of the message using the calculated encryption key;
compute a hash value by applying a first hash function to a concatenation of an identity hash value, the computed ciphertext, and the second portion of the message;
calculate a signature key using a private key, the calculated encryption key, and the computed hash value; and
output an enciphered message that includes the calculated signature key, the computed ciphertext, and the second portion of the message, wherein the signature key, s, is calculated by the equation:

$$s=(1+d_A)^{-1}(k-r \cdot d_A) \bmod n,$$

wherein $d_A$ is the private key of the transmitting-entity, k is the ephemeral key, n is the order of the base point of the elliptic curve, and r is a first signature component calculated by the equation:

$$r=e+x_Q \bmod n, \text{ and}$$

wherein e is an integer value derived from the hash value h, and $x_Q$ is an integer conversion of the x-coordinate of the ephemeral key.

10. A digital signature verification apparatus, comprising:
a processing circuit configured to:
receive an enciphered message that includes a signature key, a ciphertext, and a second portion of a message;
compute a hash value by applying a first hash function to a concatenation of an identity hash value, the received ciphertext, and the received second portion of the message;
compute an ephemeral key based on a public key, the received signature key, and the computed hash value;
compute a decryption key based on the computed ephemeral key;
calculate a first portion of the message by decrypting the received ciphertext using the computed decryption key; and
check that the calculated first portion of the message has necessary redundancy to verify the message, wherein the ephemeral key, Q', is calculated by the equation:

$$Q'=sG+(e+s)P_A, \text{ and}$$

wherein s is the signature key, $P_A$ is the public key, e is the hash value expressed as an integer, and G is a base point of an elliptic curve.

11. A non-transitory computer-readable medium having stored thereon a program that when executed by a computer causes the computer to execute the steps of:
partitioning a message to be transmitted into a first portion and a second portion;
generating an ephemeral key;
calculating an encryption key based on the generated ephemeral key and a public key;
computing a ciphertext by encrypting the first portion of the message using the calculated encryption key;
computing a hash value by applying a first hash function to a concatenation of an identity hash value, the computed ciphertext, and the second portion of the message;
calculating a signature key using a private key, the calculated encryption key, and the computed hash value; and
outputting an enciphered message that includes the calculated signature key, the computed ciphertext, and the second portion of the message, wherein the signature key, s, is calculated by the equation:

$$s=(1+d_A)^{-1}(k-r \cdot d_A) \bmod n,$$

wherein $d_A$ is the private key of the transmitting-entity, k is the ephemeral key, n is the order of the base point of the elliptic curve, and r is a first signature component calculated by the equation:

$$r=e+x_Q \bmod n, \text{ and}$$

wherein e is an integer value derived from the hash value h, and $x_Q$ is an integer conversion of the x-coordinate of the ephemeral key.

12. A non-transitory computer-readable medium having stored thereon a program that when executed by a computer causes the computer to execute the steps of:
receiving an enciphered message that includes a signature key, a ciphertext, and a second portion of a message;
computing a hash value by applying a first hash function to a concatenation of an identity hash value, the received ciphertext, and the received second portion of the message;
computing an ephemeral key based on a public key, the received signature key, and the computed hash value;
computing a decryption key based on the computed ephemeral key;
calculating a first portion of the message by decrypting the received ciphertext using the computed decryption key; and checking that the calculated first portion of the message has necessary redundancy to verify the message, wherein the ephemeral key, Q', is calculated by the equation:

$$Q'=sG+(e+s)P_A, \text{ and}$$

wherein s is the signature key, $P_A$ is the public key, e is the hash value expressed as an integer, and G is a base point of an elliptic curve.

* * * * *